(12) United States Patent
Durrant et al.

(10) Patent No.: US 9,063,286 B2
(45) Date of Patent: Jun. 23, 2015

(54) FLEX TACTICAL CABLE SPLICE

(75) Inventors: Richard Colin Edward Durrant, Crystal Lake, IL (US); Roger Kevin Helmick, New Bern, NC (US)

(73) Assignee: Advanced Fiber Products, Limited, Haverhill (GB)

( * ) Notice: Subject to any disclaimer, the term of this patent is extended or adjusted under 35 U.S.C. 154(b) by 719 days.

(21) Appl. No.: 13/245,853

(22) Filed: Sep. 26, 2011

(65) Prior Publication Data

US 2013/0074303 A1    Mar. 28, 2013

(51) Int. Cl.
*G02B 6/255*    (2006.01)
*G02B 6/44*    (2006.01)

(52) U.S. Cl.
CPC ......... *G02B 6/2558* (2013.01); *Y10T 29/49739* (2015.01); *G02B 6/4477* (2013.01)

(58) Field of Classification Search
USPC ....................................................... 385/96, 99
See application file for complete search history.

(56) References Cited

U.S. PATENT DOCUMENTS

| | | | |
|---|---|---|---|
| 5,367,591 A | 11/1994 | Seike | |
| 5,642,451 A * | 6/1997 | Kennedy et al. | ................ 385/99 |
| 5,894,536 A | 4/1999 | Rifkin | |
| 6,788,852 B1 * | 9/2004 | Xu et al. | .......................... 385/43 |
| 2008/0069503 A1 * | 3/2008 | Qian et al. | ..................... 385/99 |
| 2009/0060427 A1 * | 3/2009 | Wouters | .......................... 385/95 |

FOREIGN PATENT DOCUMENTS

| | | |
|---|---|---|
| JP | 57182713 U | 11/1982 |
| JP | 60196708 A | 10/1985 |

OTHER PUBLICATIONS

Fiber Optic Cable Splicing, 4 pages, no dates available, prior to Sep. 26, 2011.
Kitco Fiber Optics, Military Fiber Optics, 3 pages, no dates available, prior to Sep. 26, 2011.
International Search Report for corresponding PCT case PCT/US2012/057156, Dec. 19, 2012.

* cited by examiner

*Primary Examiner* — Hemang Sanghavi
(74) *Attorney, Agent, or Firm* — Chicago IP Law; Steven M. Evans (57) ABSTRACT

A splice protector is provided having a trough configuration body form a chamber therein with first and second openings at opposing ends of the body, and first and second end caps coupled to the first and second openings of the body of the splice protector, the first and second separable end caps each including at least one channel for passing through an optical fiber. At least one optical core having been coupled using fusion splicing, passes through the channels of the first and second end caps and the chamber, wherein the splice is located within the chamber, and a flexible filler is filled within the chamber to secure the spliced fibers therein.

20 Claims, 10 Drawing Sheets

FLEX TACTICAL CABLE SPLICE

BACKGROUND OF THE INVENTION

1. Field of the Invention

The present invention relates generally to splicing protectors for fiber optic cables, and more particularly, to a military grade and outside broadcast grade fiber optic cable splice protector with improved flexibility and reduced length and size.

2. Description of Related Art

Fiber optic cables have a plurality of uses, including being utilized in rugged and harsh environments such as tactical military and outside broadcast uses. In such harsh environments, it is not uncommon for individual fibers within a fiber optic cable containing multiple individual optical fibers to be broken or damaged. When such a break occurs, it is typically necessary to repair the broken fiber or fibers at location of the malfunction.

Two optical fiber splicing methods are commonly used for permanently joining together a broken optical fiber. Both splicing methods provide much lower insertion loss compared to fiber optic connectors. Fiber optic mechanical splicing typically provides an insertion loss of less than 0.5 dB. However, fiber optic fusion splicing typically provides an insertion loss of less than 0.1 dB, and therefore is typically preferred.

Several portable fiber optic fusion splicing machines are currently available on the market for preparing broken fibers within an optical cable, such as those designed for single and multiple fiber fusion splicing. In order to repair individual broken optical fibers within an optical cable, it is necessary to remove the outer jacket or covering of the optical cable, and also the protective buffering of the fiber and to expose the aramid fibers surrounding the individual optical fibers contained within the optical cable. Then a commercially available optical fiber fusion splice machine can then be used to fusion splice the broken fibers enabling them to be repaired. However, once the optical fiber splice is completed, it is necessary to repair the optical cable by re-protecting the repaired optical fibers, replacing the cut-away portion of the jacket and protective buffering of the optical cable, and to reinstate the mechanical protective features of the cable including the tensile strength characteristics.

For optical cables operating in harsh environments, such as those encountered in military uses, it is necessary for the repaired section of the optical cable to be environmentally sealed, durable and strong. Furthermore, optical cables are generally stored and transported by being wound around transportable storage and payout spools. To be wound on a transport or storage spool the optical cable must be flexible as well as strong to be wound around a spool. Furthermore, if a repaired section of an optical cable is not flexible or has a significantly larger diameter than the remaining undamaged portion of the cable, it becomes difficult to wind such repaired cable onto the spool.

Additionally, if a portion of the repaired cable has a larger diameter than the undamaged sections, it becomes difficult to pull or drag the cable to a desired location because the repaired section or portion having a larger diameter can get caught on corners and edges when the cable is being threaded or dragged for deployment.

Conventional techniques and methods for repairing broken fibers within an optical cable generally result in the repaired section being substantially more rigid than the undamaged sections of the cable. Moreover, such conventional techniques typically result in the repaired section being substantially larger in diameter than the undamaged sections of the cable.

Accordingly, there is a need for an apparatus and method for repairing an optical cable having a broken optical fiber, wherein the repaired section of the optical cable has increased flexibility, while minimizing the repaired section's diameter and length.

SUMMARY OF THE INVENTION

In accordance with the present invention, a splice protector is provided having a trough configuration body forming a chamber therein with first and second openings at opposing ends of the body, and first and second end caps coupled to the first and second openings of the body of the splice protector, the first and second separable end caps each including at least one channel for passing through an optical fiber. At least one optical core having been coupled using fusion splicing, passes through the channels of the first and second end caps and the chamber, wherein the splice is located within the chamber, and a flexible filler is filled within the chamber to secure the spliced fibers therein.

The foregoing has outlined, rather broadly, the preferred features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiments as a basis for designing or modifying other structures for carrying out the same purposes of the present invention and that such other structures do not depart from the spirit and scope of the invention in its broadest form.

DETAILED DESCRIPTION OF THE PREFERRED EMBODIMENT

Figure 1:
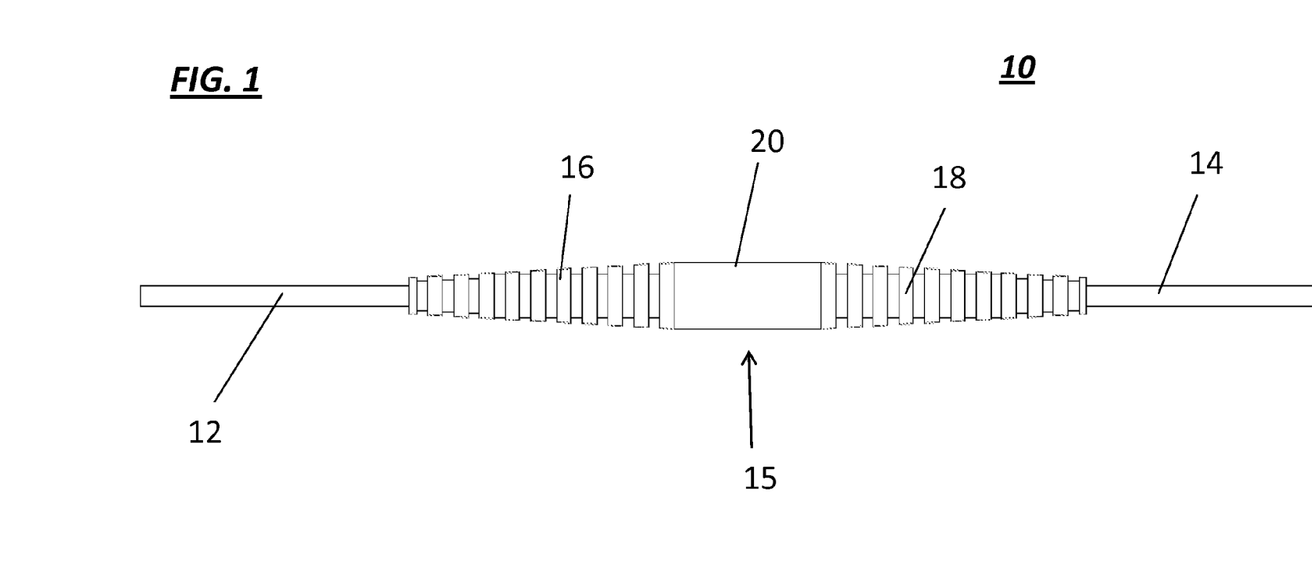
FIG. 1 illustrates a flexible optical splice protector configured in accordance with the present invention.

Referring now to the drawings, FIG. 1 illustrates an optical fiber or fiber optic splice protector 10 configured in accordance with the present invention. The splice protector 10 securely connects opposing ends 12 and 14 of an optical cable containing at least one optical fiber therein that has been repaired by splicing, preferably using fusion splicing techniques. Also illustrated in accordance with the present invention are first and second flexible sleeves 16, 18 which are coupled together at the location of the spliced fiber or fibers. A low-temp glue or other over molding and re-protection material 20 is applied to coupling 15 to enclose, surround and environmentally seal the spliced optical fiber or fibers contained inside. The flexible sleeves 16,18 are preferably constructed of a flexible material such at rubber or a flexible plastic.

Figure 2:
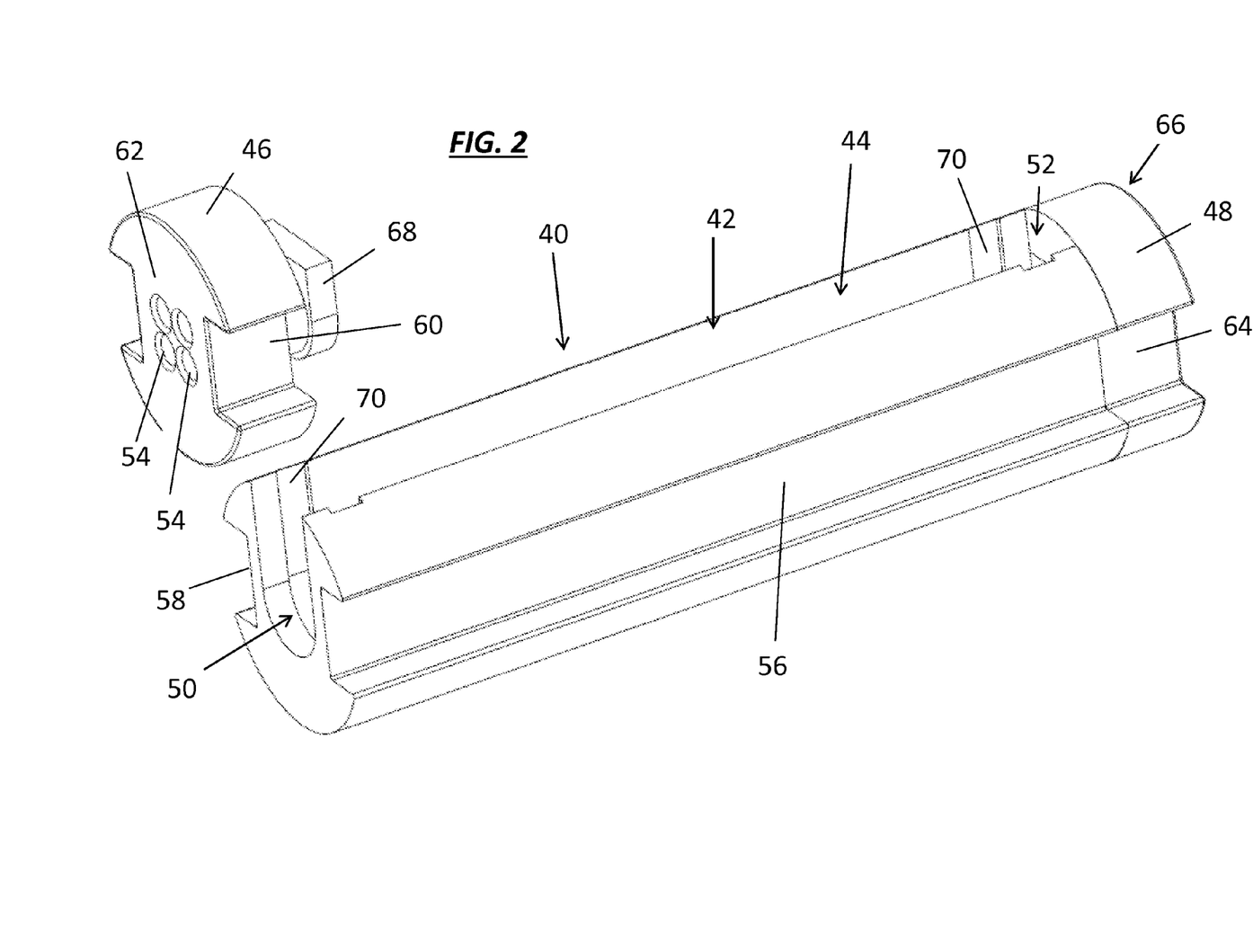
FIG. 2 illustrates a fiber optic splice protector configured in accordance with the present invention.

FIG. 2 illustrates a body 40 of a splice protector configured to form a trough having an opening 42 to a chamber 44 contained therein. The body 40 preferably is constructed of durable polymer, such as plastic. The body 40 has an elongated configuration and includes end caps 46, 48 coupled to openings 50, 52 at opposing ends of the body 40. The end caps 46, 48 include channels 54 enabling optical fibers to pass completely through the end caps 46, 48. Grooves 56,58 which extend the length of the body 40 longitudinally can be included for positioning amirid fibers from the optical cable. Grooves 60, 62 and grooves 64, 66 corresponding to the grooves 56,58, respectively, in the body 40, and can be included in the end caps 46, 48, as illustrated.

The end caps 46, 48 are preferably slidably coupled to the openings 50, 52 of the body 40. End caps 46, 48 include a mounting plate 68 which slides into corresponding grooves 70 proximate each of the openings 50, 52 for slidably securing the end caps 46, 48 to the open ends 50,52 of the body 40.

Figure 3:
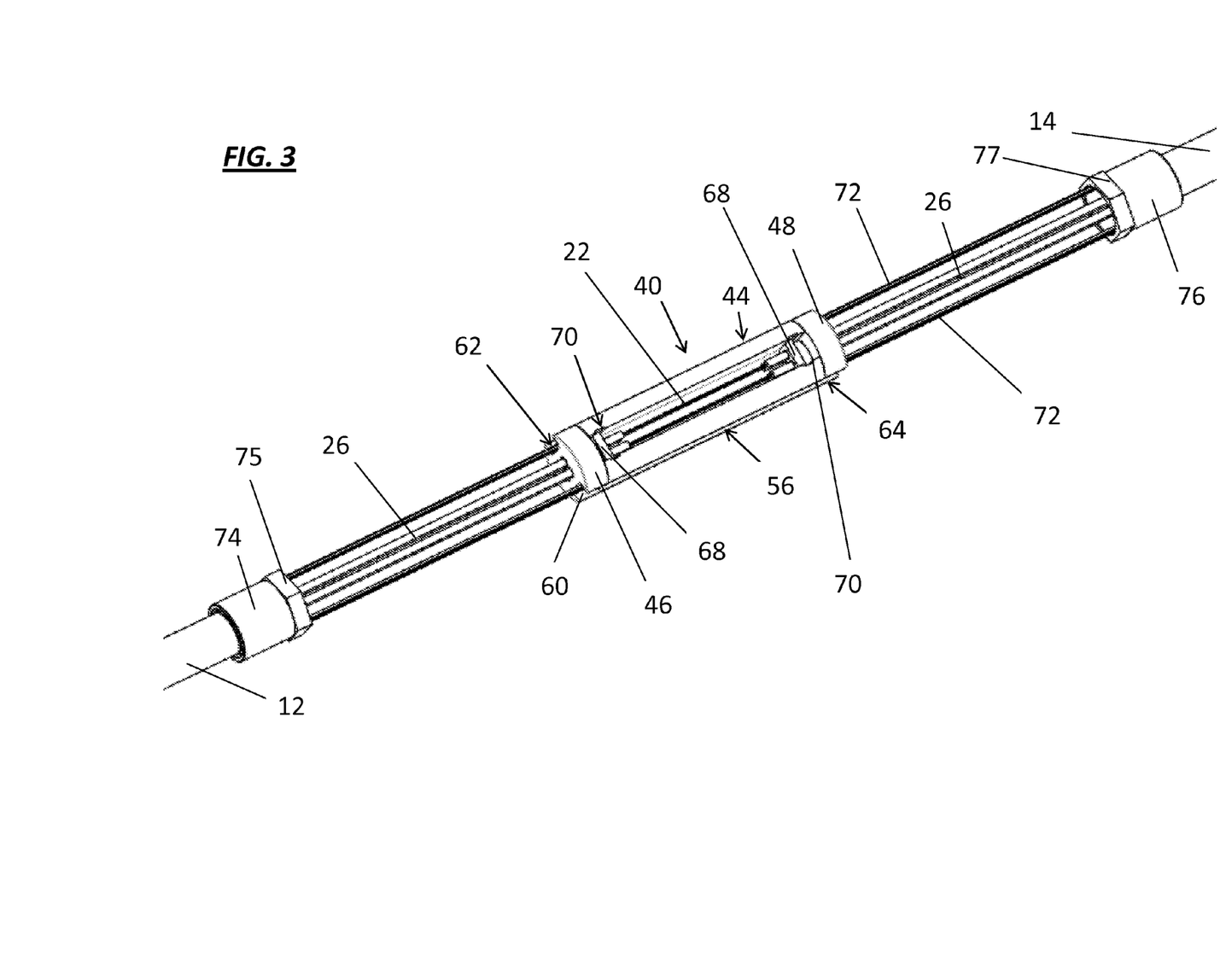
FIG. 3 illustrates the fiber optic splice protector of FIG. 2 being incorporated between two optical fibers.

FIG. 3 illustrates the body 40 of the splice protector being installed around repaired optical fibers 22, between undamaged optical fibers 26. An ultraviolet (UV) resin or air cured two part epoxy is used to fill the chamber 44 and surround the spliced fibers 22 inside the body 40 and form a flexible splice protect of the cores of the fiber 22. The end caps 46,48 are shown slidably mounted to the body 40 by inserting the mounting plates 68 into the grooves 70.

Arimid fibers 72, such as Kevlar®, which originate within the cables 12,14 and are exposed when the outer protective skin of the cables 12,14 is removed, provide added strength and support to the filber splice. Crimping tubes or crimping loops 74,76 are placed at the ends of the cables 12,14 for securing the arimid fibers 72 to the ends of the cables 12,14.

Figure 4A:
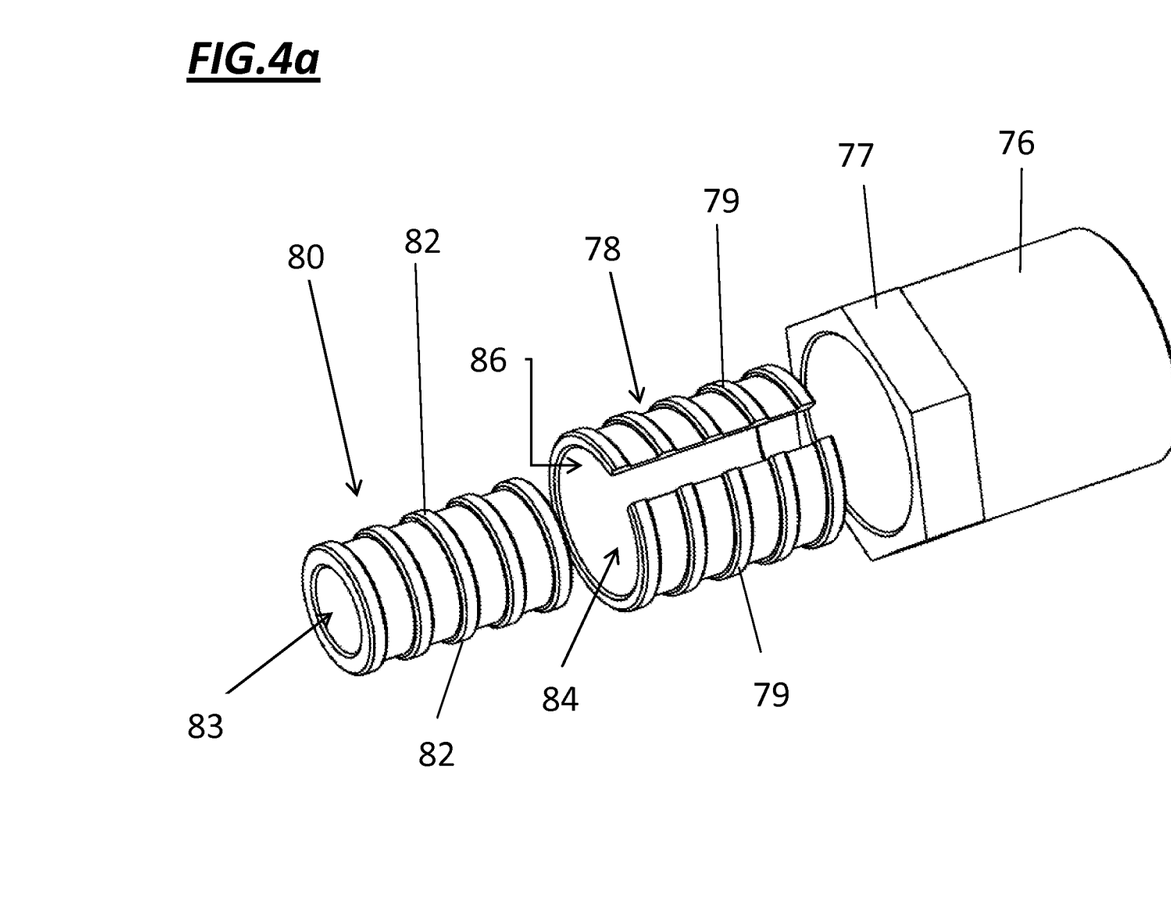
FIG. 4a illustrates a tubular crimp configured in accordance with the present invention.

FIG. 4a illustrates the crimping loop 76 having a hexagon rim 77. A middle crimping tube or a middle crimping loop 78 is sized to be placed inside the crimping loop 76, and a smaller crimping loop 80 is sized to be positioned inside the middle crimping loop 78. All the crimping loops are preferably constructed of metal, such as brass. The middle crimping loop includes a break 85 to provide sprung retention for positioning during the assembly stage prior to the positioning and assembly of the outer arimid and final crimp component. The smaller crimping loop 80 includes circular ribs 82 for added strength and an opening 83. The middle crimping loop 78 also includes circular ribs for added strength and an opening 86. Each of the crimping loops 76,78,80 are preferably each molded into a unitary component.

Figure 4B:
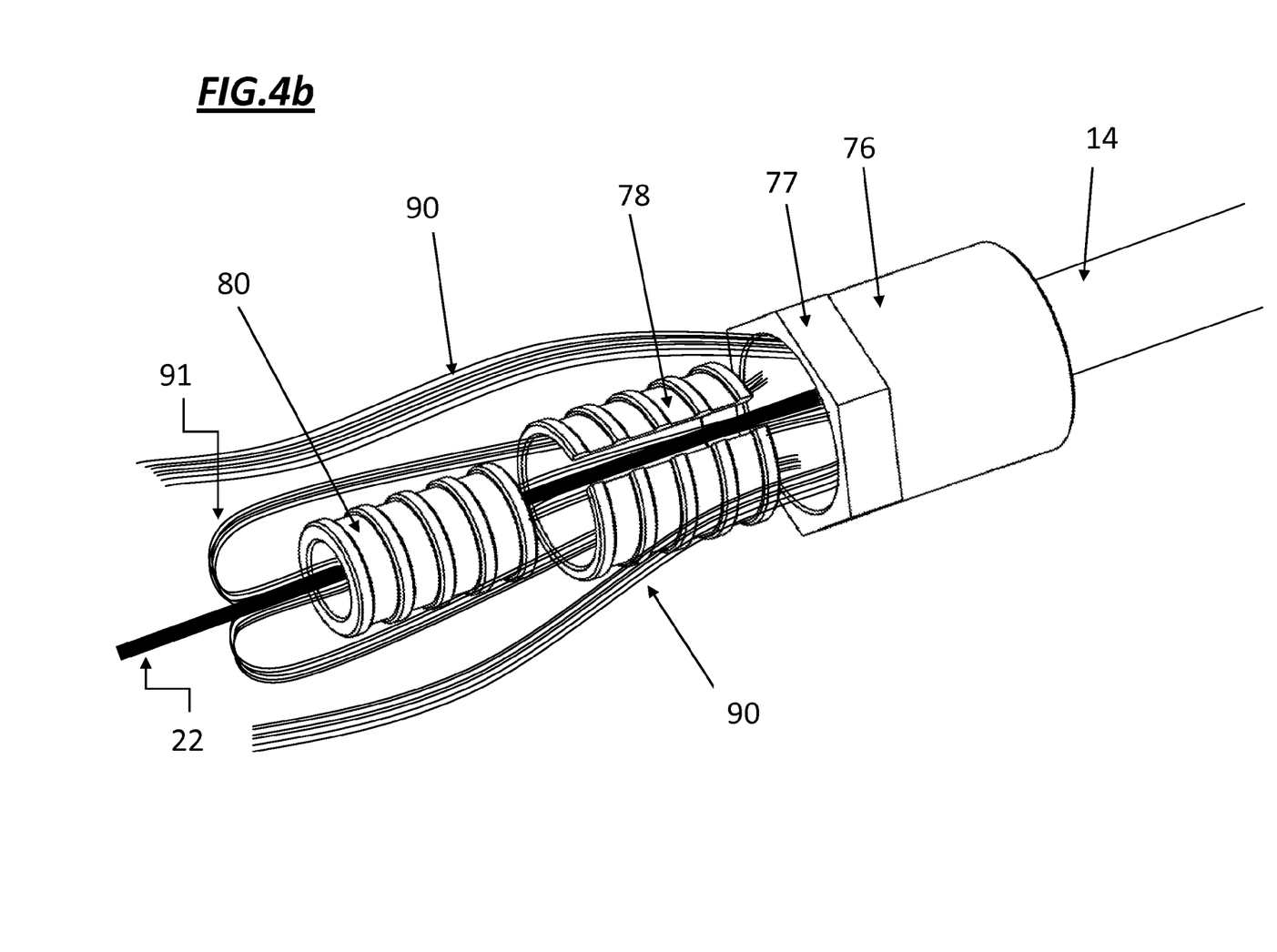
FIG. 4b illustrates the tubular crimp of FIG. 4a including aramid fibers being secured to the tubular crimp.

FIG. 4a illustrates how the aramid fibers from optical cables are interwoven between the crimping loops 76,78,80 to secure the aramid fibers to the end of the cable 14 and be securely held in position. Aramid fibers 91 originating from the cable 14 are initially threaded through the inside opening 83 of the smaller crimping loop 80, and then back around the outside of the smaller crimping loop 80 and into the opening of the middle crimping loop 78. The break 84 in the middle crimping loop 78 can facilitate this procedure. The middle crimping loop 78 is then slid around the smaller crimping loop 80 to temporarily secure the aramid fibers in place. The middle crimping loop 78 is then located inside the crimping loop 76 with the aramid from the opposing cable end sandwiched between loop 78 and loop 76 and all the aramid and crimping loops are singularly crimped together.

Aramid fibers 90 originating from another cable, such as cable 12 shown in FIG. 1, is threaded over the outside of the middle crimping loop 78 and into the opening of the crimping loop 76. The aramid fibers 90 are held in place by placing the middle crimping loop into the opening of the crimping loop 76, and then the crimping loop 76 is squeezed or crimped to hold the fibers 90 in place. The ribs 79 and 82 on the crimping loop 78 and 80, respectively, also function to secure the aramid fibers in place. Additionally, a body agent such as epoxy can be added to further secure the aramid fibers in place.

Figure 5:
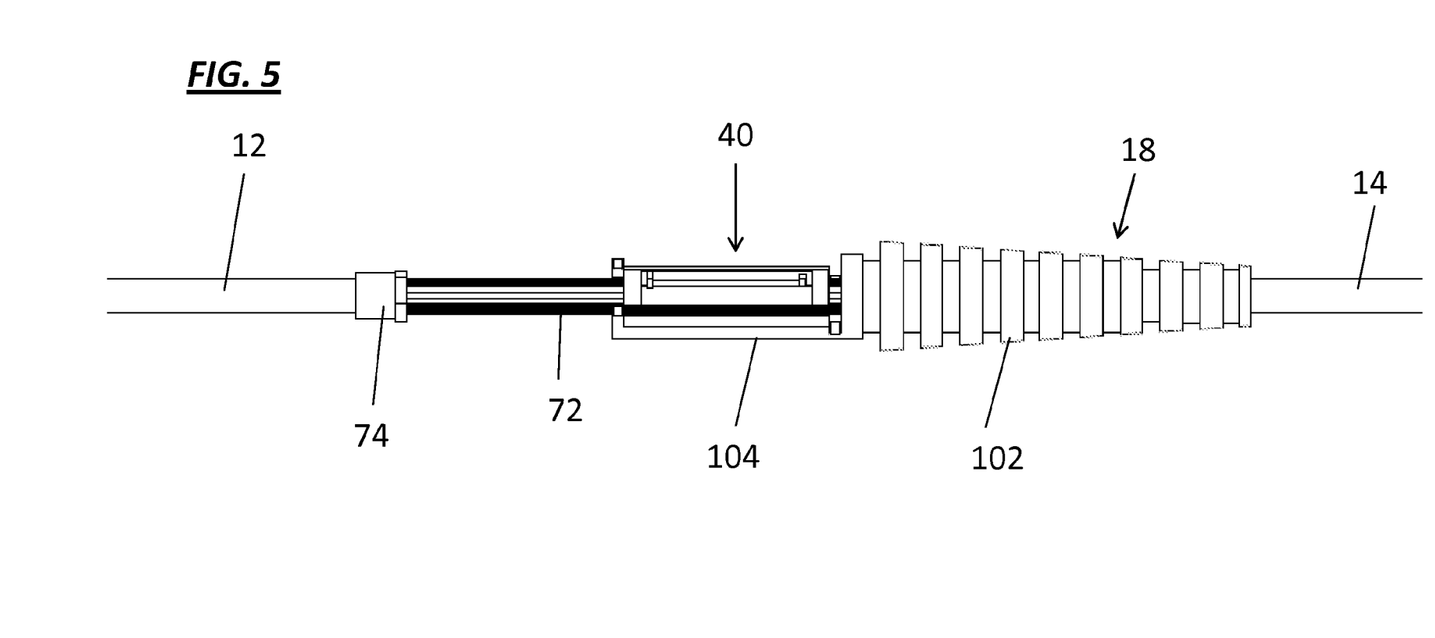
FIG. 5 illustrates the optical splice protector shown in FIG. 3 including a flexible sleeve.

FIG. 5 illustrates the splice protector 10 of FIG. 1, wherein the coupler 104 of the flexible sleeve 18 is shown. The body of the splice protector 40 and the aramid fibers 72 are also illustrated.

Figure 6:
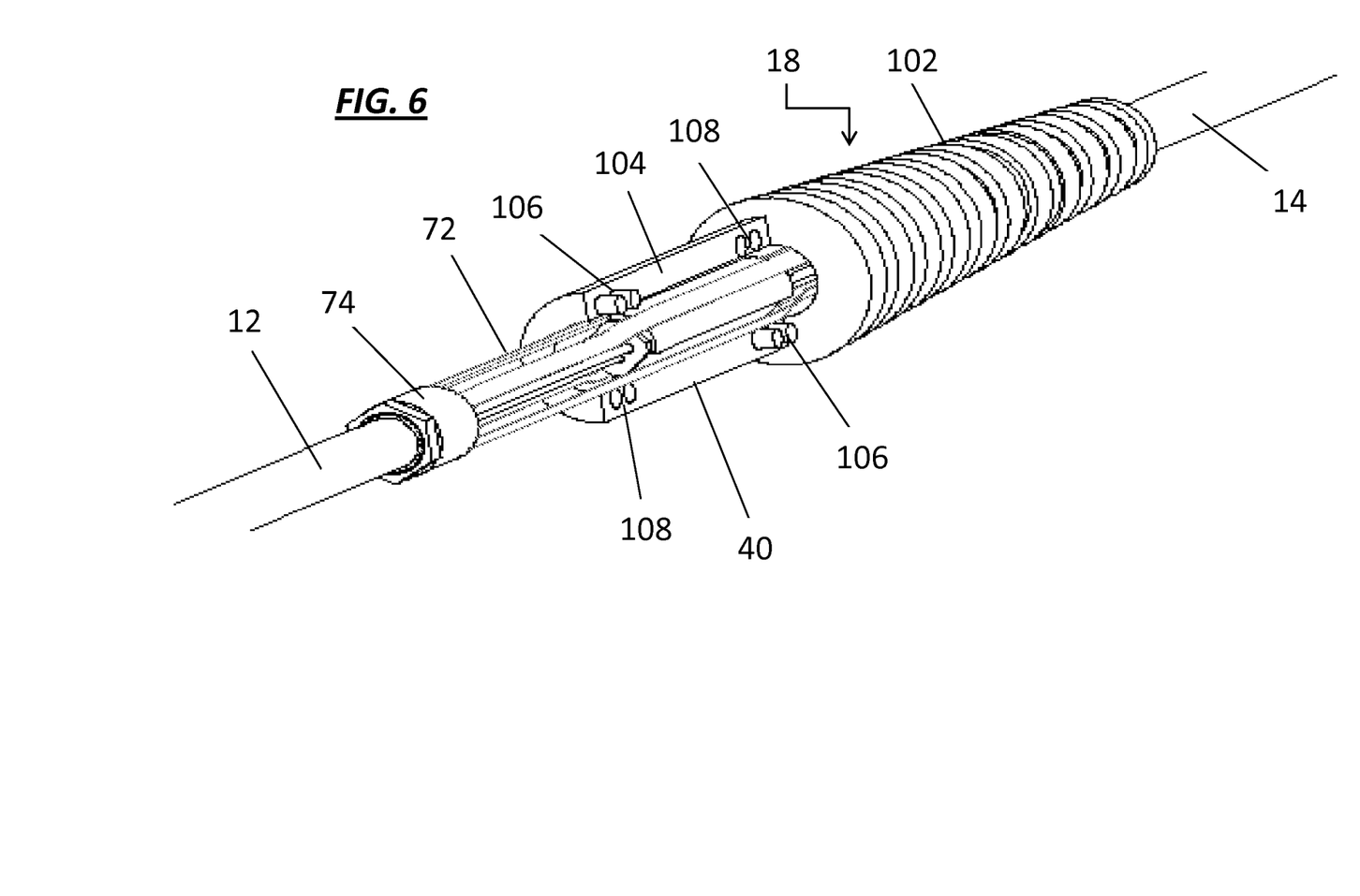
FIG. 6 illustrates a perspective view of the flexible sleeve shown in FIG. 5.

FIG. 6 provides a perspective view of the flexible sleeve 18 shown in FIG. 5. The couple 104 of the flexible sleeve is shown in detail. It should be noted that the flexible sleeve 16 of FIG. 1 has a similar construction. The flexible sleeve 18 includes ribs 102 for flexibility. The coupler 104 includes posts 106 and apertures 108 to mate with the corresponding posts and apertures of the coupler of the flexible sleeve 16, which has a similar design.

Figure 7:
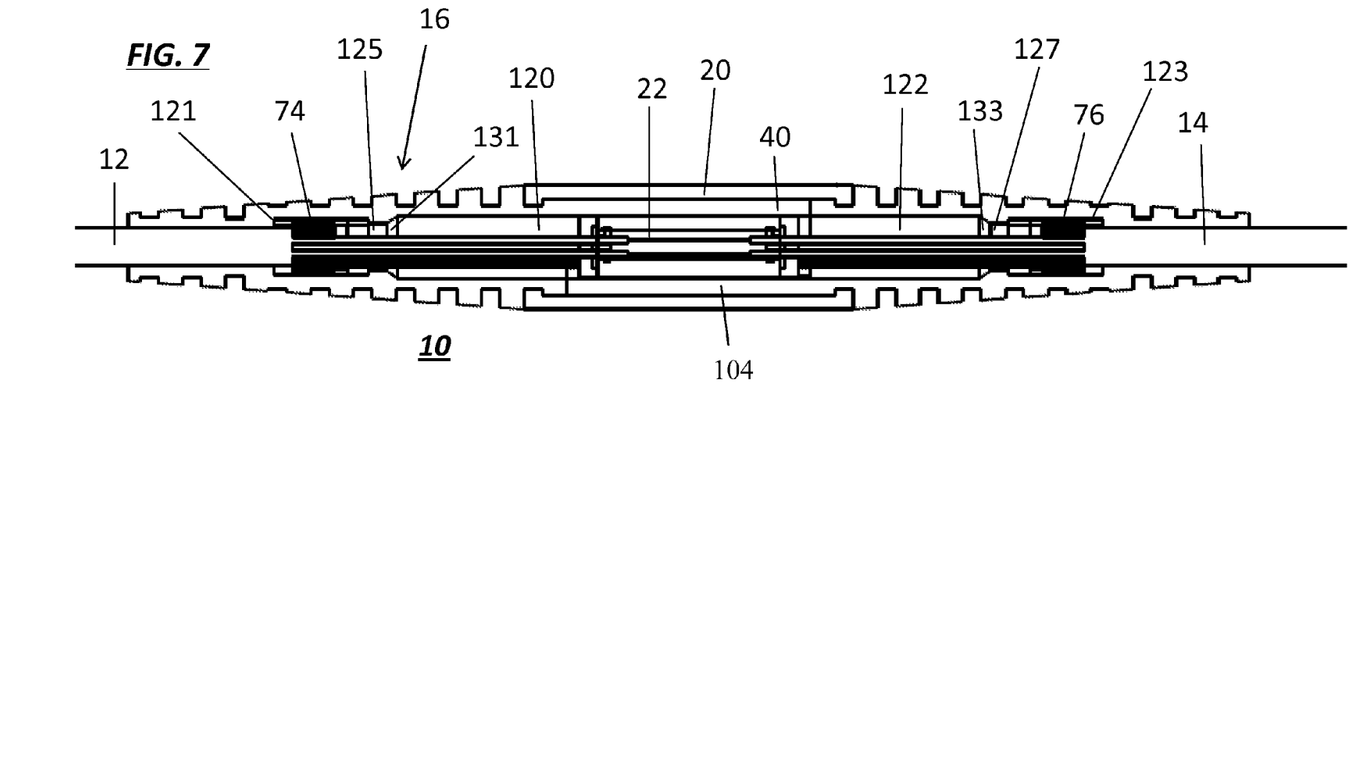
FIG. 7 illustrates a cross-sectional view of the splice protector shown in FIG. 1.

FIG. 7 is a cross-sectional view of the fiber optic splice protector 10 shown in FIG. 1. The flexible sleeve protectors 16 and 18 are shown having internal cavities 120 and 122, and cavities 121,123 for the crimping loops 74,76, respectively. Barriers 125,127 having a smaller hexagonal section diameter to key to the outer shape of the crimp loop portion 77 to prevent cable rotation with respect to the completed repair, and are constructed between the adjacent cavities 121,120 and 122,123, respectively. The barriers 125,127 include inclined slopes 131,133, respectively, to facilitate the insertion of the crimping loops 74,74 from the chambers 120,122 to the holding chambers 121,123, respectively. The barriers 125,127 keep the crimping loops 74,76 from sliding towards the spliced fibers, thus strengthening the splice protector 10 and preventing compressive damage to the fibers.

Figure 8:
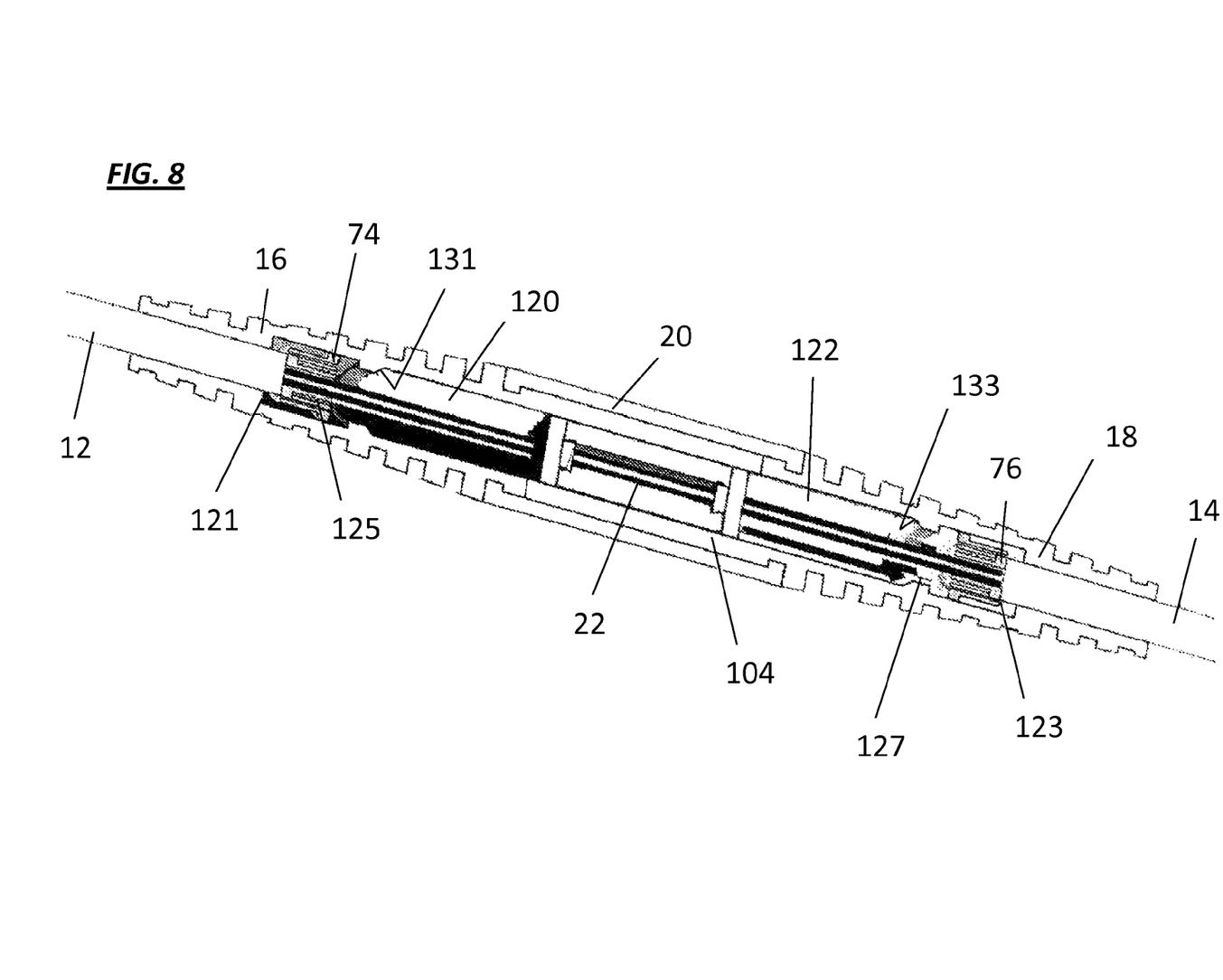
FIG. 8 is a perspective view of the splice protector shown in FIG. 7.

FIG. 8 is a perspective cross-sectional view of the splice protector 10 shown in FIG. 7.

Figure 9:
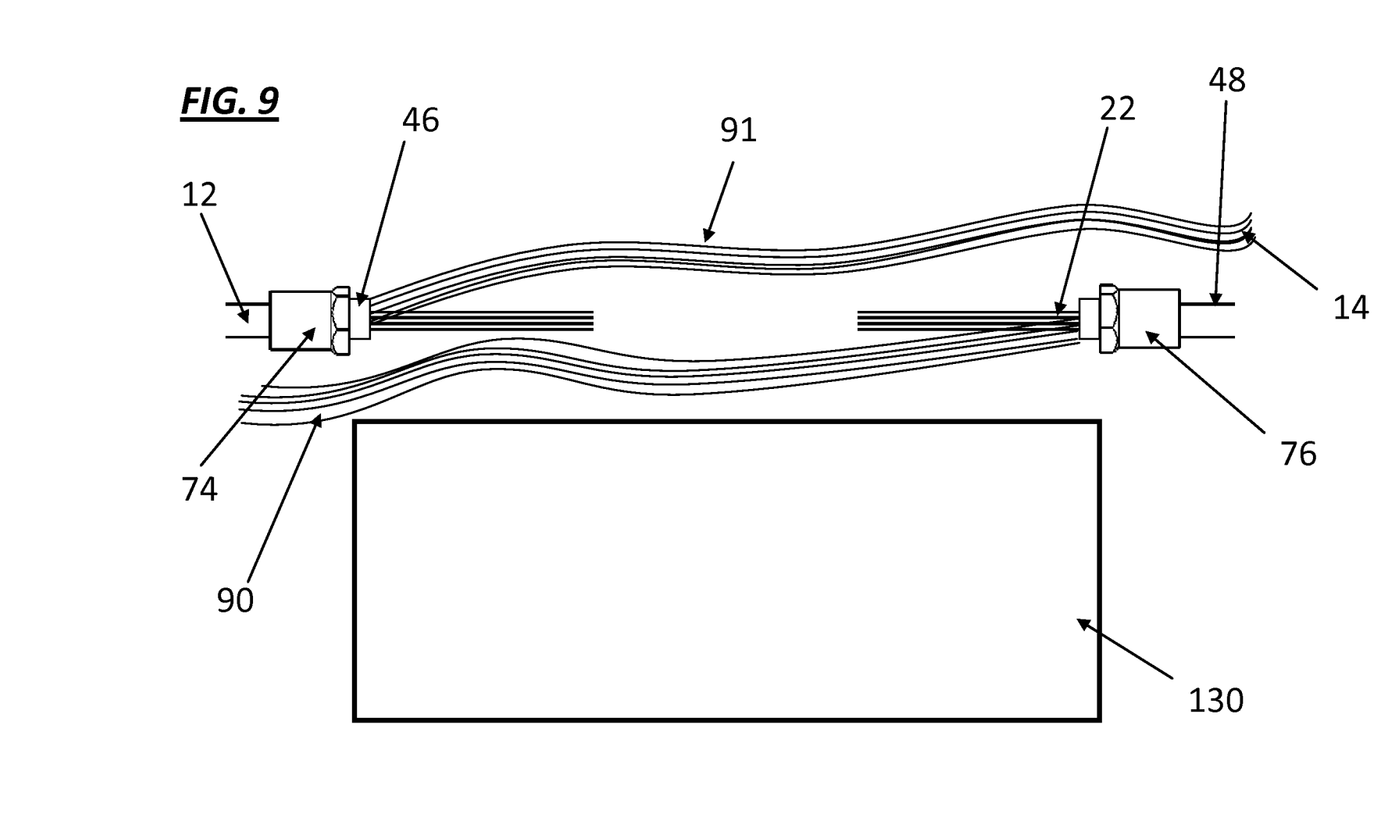
FIG. 9 illustrates two broken optical fibers being repaired using an optical fusion splicing machine and components of the present invention.

FIG. 9 illustrates a conventional optical fusion splice machine utilizing a preferred method of the present invention. In accordance with the present invention, the length of the splice protector 10 of the present invention is minimized to the length necessary for the fusion splice machine 130 to fusion splice the broken optical fiber 22. The width of the splice machine 130 prevents the length of the splice protector 10 from being shorter. However, the length of the splice protector 10 of the present invention is still shorter than conventional splice protectors for optical fibers.

Referring now to FIGS. 1-9, the installation process and method of the present invention is as follows:

Having located the fault in the cable and the broken or damaged fibers, the damaged section is cut clean out to leave two clean ends of the ruggedized cable. The new flexible splice protection components 16 & 18 are threaded onto each side of the prepared cable ends with the smaller diameter away from repair joint. Crimp loops 76 are threaded onto each side of the prepared cable ends with the hex feature 77 away from the joint. The outer jacket of the cable is removed over a length long enough on each cable side to expose aramid yarn of a length long enough to reach across the completed repair joint. The crimp loops 80 are the threaded onto each side over the exposed secondary coated fibers to butt up to the end face of the cut outer jackets on either side of the joint.

The splice protector component flanges 46 & 48 are then threaded onto each side of the prepared cable so that the secondary coated fibers, typically 1 >4 fibers are threaded through the apertures in either flange. The secondary coated fibers from each side of the prepared cable are then removed to expose bare glass fibers to a length suitable for fusion splicing the stripped ends together using a conventional single or ribbon fusion splice machine. The fibers are cleaned prepared with cleaved end tips and fusion spliced together in a conventional manner. The flanges 46 & 48 are then slid back down the secondary coated fibers towards the fusion repair point to a length at which the slice protection component 44 can be slid on sideways over the spliced glass fibers to fit to the two flanges of the protector 46 & 48. Having positioned the three part protector equidistant over the bare glass fusion splices, the trough of the resultant protector component is filled with UV or two part epoxy and the glue cured off to 'pot' the fusion splice repairs to the fibers and create a robust encasement of the repair joints. The middle crimp component 78 is then slid on sideways over the aramid yarn and secondary coated fibers on either side of the repair assembly by use of the slot 84 in the component. On one side of the repair assembly 14 the crimp loop 78 is then slid up and over the inner crimp loop 80 which is abutted to the cable jacket on that side with the aramid laying over the top of the middle crimp loop 78. The outer crimp loop 76 is then pulled back down the cable 14 over the crimp and aramid subassembly formed by inner crimp 80, middle crimp 76, and the aramid. All 3 crimp components are the crimped firmly in place at the end of cable 14.

The aramid from cable end 12 is then threaded through the inner diameter of crimp loop 80. The second middle crimp loop 78 is then similarly slid over the secondary coated fibers on cable end 12. It is then lid back towards the cable jacket end 12 and the Kevlar from that side of the cable is drawn over the outside of crimp loop 80 and held in place by sliding middle crimp component 78 over the top of it. Excess aramid extending back towards cable end 12 is the trimmed behind the middle crimp component. The aramid from the opposing cable end 14 is then laid evenly over the middle crimp 78 at cable end 12 and the outer crimp component 76 drawn back down the cable towards the repair joint and positioned over the two other crimp components and trapped aramid from cable end 12. The whole crimp and dual aramid sandwich of material is then finally crimped. At all stages epoxy adhesive may be added at any aramid crimp interface to strengthen the resultant crimp strength characteristics. With the crimping completed at both ends of the cable repair the outer protective components 16 & 18 are slid over the cable jackets 12 & 14 towards the splice repair point, and over the outer crimp components 76 until they are located in the keyed female pockets in the components 16 & 18. They are then clipped together and some adhesive applied in the longitudinal joint prior to final assembly. The whole assembly is them placed in a small split mold tool cavity which is clamped shut around the center portion of the combined outer protection sleeves to form a tubular mold cavity. Cold or heat cure single or two part adhesive or molding compound is the injected in and through the mold cavity and allowed to cure off to create a final overmold feature to environmentally seal the two sides of the splice protection assembly together.

While specific embodiments have been shown and described to point out fundamental and novel features of the invention as applied to the preferred embodiments, it will be understood that various omissions and substitutions and changes of the form and details of the apparatus illustrated and in the operation may be done by those skilled in the art, without departing from the spirit of the invention.

The invention claimed is:

1. A fiber optic splice protector, comprising:
    a splice protector having a trough configuration body extending longitudinally and forming a chamber therein with first and second openings at opposing ends of the body;
    first and second end caps coupled to the first and second openings of the body of the splice protector, the first and second end caps each including at least one channel for passing through an optical fiber;
    at least one optical core having been coupled using fusion splicing, passing through the at least one channel of the first and second end caps and the chamber, wherein the splice is located within the chamber;
    flexible filler located within the chamber to secure the at least one optical core therein;
    the body of the splice protector includes a first and second slot proximate the first and second openings, respectively; and
    said first and second end caps each include a mounting plate sized to fit within the first and second slots, respectively, to secure the first and second end caps to the first and second openings of the body of the splice protector.

2. The fiber optic splice protector of claim 1, further comprising:
    an optical fiber cable including the optical core, and further including cladding, aramid fibers, all encased within a jacket to form the optical cable;
    a portion of the jacket being removed to expose the spliced section of the at least one optical core, and the aramid fibers, fiber core and cladding proximate to the spliced section of the optical core; and
    first and second crimping tubes at opposing ends of the removed jacket, wherein the first and second crimping tubes secure the aramid fibers to the opposing ends of the removed jacket.

3. The fiber optic splice protector of claim 2, wherein an adhesive is used to secure the aramid fibers to the first and second crimping tubes.

4. The fiber optic splice protector of claim 2, wherein the first and second crimping tubes each include an inner crimping tube inside to further secure the aramid fibers to the jacket by feeding the aramid fiber between the crimping tubes and the inner crimping tubes.

5. The fiber optic splice protector of claim 2, further comprising:
    first and second flexible protection sleeves at opposing ends of the removed jacket and coupling together in between, and said flexible protection sleeves covering the crimping tubes and the splice protector.

6. The fiber optic splice protector of claim 5, wherein the first and second flexible sleeves include ribs from increased flexibility.

7. The fiber optic splice protector of claim 5, further comprising:
    a flexible adhesive surrounding and enclosing the coupling between the first and second flexible protecting sleeves.

8. The fiber optic splice protector of claim 2, further comprising:
    an inner crimping tube located within each of the crimping tubes, and said inner crimping tubes being cut longitudinally on one side.

9. A method for installing an optical fiber splice protector, comprising the steps of:

locating a broken optical fiber within an optical cable;
removing a portion of jacket on the optical cable covering and proximate to the broken optical fiber;
separating aramid fibers from and surrounding the broken optical fiber;
placing an end cap on opposing ends of the broken optical fiber;
fusion splicing an optical fiber within a fiber optic cable;
placing the spliced optical fiber within a chamber of a flexible body of a splice protector having a trough configuration extending longitudinally;
coupling the end caps at opposing open ends of the flexible body of the splice protector;
filling the chamber with a flexible adhesive to secure the spliced cable therein; and
wherein the coupling step includes sliding the end caps onto and perpendicularly to the longitudinally extending body.

10. The method of claim 9, further comprising the steps of:
sliding a crimping loop over each end of the optical cable adjacent to portion having the jacket removed; and
positioning the aramid fibers within the crimping loops; and
crimping the aramid fibers to secure the aramid fibers within the crimping loops.

11. The method of claim 10, further comprising the step of:
adding adhesive to the aramid fibers to glue the aramid fibers to the crimping loops.

12. The method of claim 10, further comprising the step of:
sliding a flexible sleeve over each crimping loop and coupling the flexible sleeves together over the flexible body of the splice protector.

13. The method of claim 12, further comprising the step of:
surrounding and enclosing the coupling between the flexible sleeves with at least one of a flexible adhesive and other re-protective overmolding to seal the coupling.

14. A fiber optic splice protector, comprising:
a splice protector having a body with a chute configuration forming a chamber therein, and first and second openings at opposing ends of the chute body;
first and second end caps coupled to the first and second openings of the chute body of the splice protector, the first and second end caps each including at least one channel for passing through an optical fiber;
at least one optical core having been coupled using fusion splicing, passing through the at least one channel of the first and second end caps and the chamber, wherein the splice is located within the chamber;
flexible filler located within the chamber to secure the at least one optical core therein;
the body of the splice protector includes a first and second slot proximate the first and second openings, respectively; and
at least a portion of the first end cap is located within the first slot and at least a portion of the second end cap is located within the second slot to secure the first and second end caps to the first and second openings of the body of the splice protector.

15. The fiber optic splice protector of claim 14, further comprising:
an optical fiber cable including the optical core, and further including cladding, aramid fibers, all encased within a jacket to form the optical cable;
a portion of the jacket being removed to expose the spliced section of the at least one optical core, and the aramid fibers, fiber core and cladding proximate to the spliced section of the optical core; and
first and second crimping tubes at opposing ends of the removed jacket, wherein the first and second crimping tubes secure the aramid fibers to the opposing ends of the removed jacket.

16. The fiber optic splice protector of claim 15, wherein an adhesive is used to secure the aramid fibers to the first and second crimping tubes.

17. The fiber optic splice protector of claim 15, wherein the first and second crimping tubes each include an inner crimping tube inside to further secure the aramid fibers to the jacket by feeding the aramid fiber between the crimping tubes and the inner crimping tubes.

18. The fiber optic splice protector of claim 15, further comprising:
first and second flexible protection sleeves at opposing ends of the removed jacket and coupling together in between, and said flexible protection sleeves covering the crimping tubes and the splice protector.

19. The fiber optic splice protector of claim 18, further comprising:
a flexible adhesive surrounding and enclosing the coupling between the first and second flexible protecting sleeves.

20. The fiber optic splice protector of claim 15, further comprising:
an inner crimping tube located within each of the crimping tubes, and said inner crimping tubes being cut longitudinally on one side.

* * * * *